Patented Dec. 5, 1939

2,182,074

UNITED STATES PATENT OFFICE 2,182,074

HORMONE

Wilhelm Dirscherl, Frankfort-on-the-Main, and Josef Kraus, Mannheim, Germany, assignor to Rare Chemicals, Inc., Nepara Park, N. Y., a corporation of New York No Drawing. Application August 12, 1936, Serial No. 95,714. In Germany August 16, 1935

2 Claims. (Cl. 167—74)

This invention relates to hormones and particularly to male acting hormones.

We have discovered that substances having characteristics of male acting hormones are present in wool fat or suint (adeps lanae).

These hormones differ from the known male acting hormones in that they do not substantially influence the growth of a capon's comb, but show a considerable activity in the seminal vesicle test of mice of Loewe and Voss (Klinische Wochenschrift, 1930, vol. 9, p. 481).

The other known hormone preparations of male activity either do not show this activity on the seminal vesicle at all, or if they do, only in combination with a strong activity on the capon's comb.

This invention, therefore, has for its salient object to obtain or derive a new male acting sexual hormone from wool fat or from components or parts thereof such as the sterols.

The term "sterols" is to be understood to comprise also isocholesterol.

Another object of the invention is to provide a method of deriving or extracting male acting hormones from wool fat or components thereof.

Further objects of the invention will appear from the following specification.

The invention briefly described consists of a new product, namely, a new male acting sexual hormone derived from wool fat or components or parts thereof such as the sterols, especially isocholesterol.

The invention further consists of a method of extracting or deriving the new male acting hormone from the material mentioned by the use of solvents and purifying the extract with other physical or chemical methods. Suitable solvents are aqueous and nonaqueous liquids. Suitable aqueous liquids are: water, aqueous solutions of inorganic or organic bases, especially weak bases, aqueous solutions of inorganic or organic acids, especially weak acids, aqueous solutions of inorganic or organic salts, further aqueous solutions of organic solvents soluble in water, as dioxane and alcohols, e. g., methanol, ethanol, propanol, glycol, glycerol. As nonaqueous liquids may be used; liquids soluble in water as anhydrous alcohols and liquids not soluble in water as benzene. When working at higher temperatures it is suitable to use anhydrous or substantially anhydrous alcohols; on cooling most of the active substance is precipitated. When working with an extracting product not soluble in water the active material is suitably extracted therefrom by means of an aqueous liquid as, e. g., water or dilute alcohol.

The extract thus obtained may be freed from solvent by distillation. On dissolving a second time and precipitating with a suitable organic liquid, furthermore on treating with ketone reagents and following decomposition of the addition compounds thus formed, a further concentration of the active substance may be attained.

The extraction may be carried out cold as well as by an elevated temperature. When working in the cold the use of stirring or kneading equipment is necessary to obtain a complete extraction. To obtain a thorough mixing and complete extraction the addition of an emulsifying agent is helpful. When working at a higher temperature a thorough mixing of the material to be extracted, with the extracting medium, is accomplished with a stirring or shaking apparatus.

To find out the most efficient kind of extracting from raw materials or from sterols it is advisable to prove the hormone content of the initial material by means of the seminal vesicle test. It is also suitable to verify the course of extraction and of enrichment of the active substance by the same method. In an analogous manner may be proved the separation from other hormones simultaneously present and for the concentration, purification and standardization of the final solutions and of the solid products obtained therefrom.

With these substances the seminal vesicle unit is generally contained in 100$\gamma$, in some cases also is less than 100$\gamma$.

The following are examples of satisfactory methods or modes of procedure:

*Example 1.*—24 gms. liquified wool fat is shaken with 250 ccs. water, at first warm and then maintained at room temperature for several days. The mixture is at first creamlike, after a while when cooled separates into aqueous and fatty layers. The two layers are separated and the aqueous extract is evaporated, leaving a residue of 54 mgms., which contains 27 M. U., when tested (definition of the M. U. see Klinische Wochenschrift, vol. 9, p. 481).

Practically the same result is obtained by shaking the wool fat with dilute (60%) alcohol, instead of water.

*Example 2.*—5.4 gms. wool fat is heated with 27 gms. alcohol (96%) to boil. About 80% of the wool fat remains undissolved. The alcoholic solution is now filtered while warm. After cooling a precipitate of 60 mgms. is obtained, which contains about 12 M. U. The alcoholic filtrate still contains active material, which through further purification, like shaking with water can be separated or enriched from the mixture of residual material.

*Example 3.*—2 gms. isocholesterol, obtained from wool fat as described in "Zeitschr. für physiol. Chemie", (1930) vol. 155, page 243, is dissolved in 200 ccs. benzene, and the solution is shaken with 300 ccs. of dilute (60%) alcohol for one hour. The aqueous alcoholic solution which, of course, contains also a small amount of benzene, is separated and evaporated to dryness. A part of the residue, corresponding to 20 mgms. of the extracted isocholesterol shows not quite a whole M. U.

From the benzene layer some more of the seminal vesicle acting substance may be obtained by repeated shaking with dilute (60%) alcohol. 10 mgms. of the extraction residue (out of 2 gms. isocholesterol) contains the activity of 100–120 M. U., the M. U. is therefore contained in 80–100γ. The residue from the aqueous-alcoholic extraction is solid, colorless and soluble in organic solvents such as alcohol.

*Example 4.*—0.5 gm. isocholesterol is dissolved in 15 ccs. or more of ethylalcohol (96%) by warming. The solution is then diluted with sufficient water to reduce the alcohol content to 60%. Then the solution is shaken for several days at room temperature. The liquid is then filtered. The filtrate obtained has an activity on the seminal vesicle.

Although the invention has described in considerable detail and certain examples of methods by which the hormones may be extracted or derived have been given, it should be understood that no limitations are intended other than those imposed by the appended claims.

In the following claims the term "sterols" is to be understood to comprise also isocholesterol.

What we claim is:

1. A male acting sexual hormone comprising an extract of isocholesterol, said extract having specific activity on the seminal vesicle of the mouse equal to one M. U. is not more than 100γ when tested according to Loewe and Voss, but having substantially no activity on a capon's comb.

2. A male acting sexual hormone comprising an extract of wool fat, said extract having specific activity on the seminal vesicle of the mouse equal to one M. U. in not more than 100γ when tested according to Loewe and Voss, but having substantially no activity on a capon's comb.

WILHELM DIRSCHERL.
JOSEF KRAUS.